United States Patent
Goldstein et al.

(10) Patent No.: US 10,745,309 B2
(45) Date of Patent: Aug. 18, 2020

(54) MULTI-STEP SYSTEM FOR TREATING SELENIUM-CONTAINING WASTEWATER

(71) Applicant: General Electric Company, Schenectady, NY (US)

(72) Inventors: Jake Goldstein, Oakville (CA); Minggang Liu, Burlington (CA); Carsten Owerdieck, Oakville (CA); Nelson Fonseca, Oakville (CA); Joel Alexander Citulski, Oakville (CA)

(73) Assignee: BL TECHNOLOGIES, INC., Minnetonka, MN (US)

( * ) Notice: Subject to any disclaimer, the term of this patent is extended or adjusted under 35 U.S.C. 154(b) by 439 days.

(21) Appl. No.: 14/969,736

(22) Filed: Dec. 15, 2015

(65) Prior Publication Data
US 2016/0264439 A1 Sep. 15, 2016

Related U.S. Application Data

(60) Provisional application No. 62/131,614, filed on Mar. 11, 2015.

(51) Int. Cl.
*C02F 9/00* (2006.01)
*C02F 1/44* (2006.01)
(Continued)

(52) U.S. Cl.
CPC .............. *C02F 9/00* (2013.01); *C02F 1/004* (2013.01); *C02F 1/444* (2013.01); *C02F 1/52* (2013.01);
(Continued)

(58) Field of Classification Search
CPC ........ B01D 2311/12; B01D 2311/2688; B01D 61/145; C02F 2101/106; C02F 1/444; C02F 9/00; C02F 1/705
(Continued)

(56) References Cited

U.S. PATENT DOCUMENTS

| | | | |
|---|---|---|---|
| 6,183,644 B1 * | 2/2001 | Adams ................ | C02F 3/2806 210/611 |
| 2007/0278150 A1 * | 12/2007 | Lupton ................ | C02F 3/2806 210/615 |

(Continued)

FOREIGN PATENT DOCUMENTS

| | | |
|---|---|---|
| EP | 0891951 A1 | 1/1999 |
| EP | 1270513 A1 | 1/2003 |

(Continued)

OTHER PUBLICATIONS

European Patent Application No. 16158261.4, Search Report dated Jun. 17, 2016.

(Continued)

*Primary Examiner* — Claire A Norris

(57) ABSTRACT

This specification describes a process and apparatus for treating water comprising selenium. A process is described having the steps of treating the wastewater influent using a biological reduction process to produce an intermediary stream and reducing the concentration of unconsumed constituents in the intermediary stream by means of filtration optionally with upstream coagulation or flocculation. When compared to the wastewater influent, the intermediary stream preferably has reduced concentration of the selenium species when compared to the wastewater influent. When compared to the intermediary stream, the effluent preferably has reduced concentration of one or more of the inorganic non-metallic constituents (such as nitrogen, phosphorous and sulphur), metallic constituents or organic constituents. An apparatus is described herein having a fixed film reactor configured to receive a wastewater influent, and a membrane filter configured to receive effluent from the fixed film reactor.

3 Claims, 2 Drawing Sheets

(51) Int. Cl.
*C02F 1/00* (2006.01)
*C02F 1/52* (2006.01)
*C02F 3/28* (2006.01)
*C02F 101/10* (2006.01)

(52) U.S. Cl.
CPC .......... *C02F 3/2826* (2013.01); *C02F 3/2833* (2013.01); *C02F 2101/106* (2013.01)

(58) Field of Classification Search
USPC .................................................. 210/631, 651
See application file for complete search history.

(56) References Cited

U.S. PATENT DOCUMENTS

| | | |
|---|---|---|
| 2010/0300963 A1 | 12/2010 | Peeters et al. |
| 2014/0061130 A1* | 3/2014 | Musale .................. B01D 61/58 210/639 |
| 2014/0263043 A1 | 9/2014 | Mehta et al. |
| 2015/0034552 A1 | 2/2015 | Pickett et al. |

FOREIGN PATENT DOCUMENTS

| | | |
|---|---|---|
| JP | 3799634 B2 | 7/2006 |
| KR | 101430104 B1 | 8/2014 |
| WO | 2007012181 A1 | 2/2007 |

OTHER PUBLICATIONS

European Patent Application No. 16158261.4, Office Action dated Dec. 19, 2017.
European Patent Application No. 16158261.4, Decision to Refuse dated Oct. 17, 2019.
European Patent Application No. 16158261.4, Minutes of the Oral Proceedings dated Oct. 11, 2019.
European Patent Application No. 16158261. Summons to Attend Oral Proceedings dated May 21, 2019.

\* cited by examiner

MULTI-STEP SYSTEM FOR TREATING SELENIUM-CONTAINING WASTEWATER

CROSS-REFERENCE TO RELATED APPLICATIONS

This application is a non-provisional application of U.S. Application Ser. No. 62/131,614, filed Mar. 11, 2015. U.S. Application Ser. No. 62/131,614 is incorporated by reference.

FIELD

This specification relates to a method and apparatus for treating wastewater comprising selenium.

BACKGROUND

The following paragraphs are not an admission that any of the information below is common general knowledge or citable as prior art.

Selenium is an essential trace element, but becomes toxic at very low concentrations. Selenium accumulates in the bodies of plants and fish that live in selenium-contaminated water and in the bodies of wildlife and people that eat those plants and fish. In people, elevated selenium concentrations may cause neurological damage and hair and nail loss.

Selenium has been treated in biological reactors, for example as described in U.S. Pat. No. 6,183,644 and International Publication Number WO 2007/012181, and as used in ABMet™ reactors sold by the GE Water and Process Technologies. In such reactors, dissolved selenium is removed from contaminated water by treating the water in a reactor containing selected endemic and other selenium reducing organisms. Microbes may be isolated from the specific water or imported from other selenium contaminated water. The microbes are then screened for ability to reduce selenium under the site specific environmental conditions. The selected microbes are optimized for selenium reduction, then established in a high density biofilm within a reactor. The selenium contaminated water is passed through the reactor with optimized nutrient mix added as needed. The elemental selenium is precipitated and removed from the water. U.S. Pat. No. 6,183,644 is incorporated herein by reference.

U.S. Publication No. 2010/0300963 describes an apparatus and process for treating flue gas desulfurization blow down water or other wastewaters having selenium. The process has steps of one or more of aerobic treatment to remove chemical oxygen demand and nitrify a waste stream, anoxic treatment to denitrify a waste stream, anoxic treatment to remove selenium and anaerobic treatment to remove heavy metals and sulphur. The process may further include one or more of (a) membrane separation of the waste stream upstream of the anoxic digestion to remove selenium, (b) dilution upstream of the biological treatment step, (c) physical/chemical pretreatment upstream of the biological process or dilution step to remove total suspended solids (TSS) and soften the waste stream, or (d) ammonia stripping upstream of the biological treatment step or dilution step. One or more of these processes may be provided in a membrane bioreactor or a fixed film reactor having a granular activated carbon (GAC) bed. U.S. Publication No. 2010/0300963 is incorporated herein by reference.

SUMMARY

The following summary is intended to introduce the reader to this specification but not define any invention. Inventions may reside in the combination of one or more of the apparatus elements or process steps described anywhere in this document.

The inventors have observed that anoxic/anaerobic biological treatment may not be sufficient to meet the stringent discharge limits imposed in certain jurisdictions. Such discharge limits may affect the allowable concentration of organic, metallic and/or inorganic non-metallic constituents in the effluent.

For example, although the elemental selenium and metal-sulphide precipitates are mostly retained within the biofilter, some amount does leave with the effluent stream. Also, as the biofilter feed is typically void of the organic carbon and nutrients needed to sustain the biomass within the biofilter, a carbon and nutrient source is added to the feed stream. Although actively controlled, the amount of nutrient can at times exceed the biomass requirements resulting in higher concentrations of unconsumed organic and inorganic non-metallic constituents in the biofilter effluent.

This specification describes a process and apparatus for treating water comprising selenium. A process is described having the steps of treating the wastewater influent using a biological reduction process to produce an intermediary stream and reducing the concentration of unconsumed constituents in the intermediary stream by means of filtration optionally with upstream coagulation or flocculation. When compared to the wastewater influent, the intermediary stream preferably has reduced concentration of the selenium species when compared to the wastewater influent. When compared to the intermediary stream, the effluent preferably has reduced concentration of one or more of the inorganic non-metallic constituents (such as nitrogen, phosphorous and sulphur), metallic constituents or organic constituents.

An apparatus is described herein having a fixed film reactor configured to receive a wastewater influent, and a membrane filter configured to receive effluent from the fixed film reactor.

BRIEF DESCRIPTION OF THE DRAWINGS

Examples of embodiments of one or more inventions will be described below with reference to the Figures described below.

DETAILED DESCRIPTION

Various apparatuses or processes will be described below to provide an example of an embodiment of each claimed invention. No embodiment described below limits any claimed invention and any claimed invention may cover processes and apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. The applicants, inventors and owners reserve all rights in any invention disclosed in an apparatus or process described below that is not claimed in this document and do not abandon, disclaim or dedicate to the public any such invention by its disclosure in this document.

Selenium treating bioreactors, which are known in the art, utilize selenium reducing organisms to reduce the concentration of selenium in the influent. The elemental selenium precipitate is mostly retained within the bioreactor, however, some amount of selenium does leave the bioreactor through the effluent stream. In addition, nutrients are typically added to the bioreactor influent to sustain the biomass required for treatment. Although actively controlled, the amount of nutrient added can at times be in excess of what is required resulting in higher concentration of unconsumed organic and inorganic non-metallic constituents in the bioreactor effluent. Also, the wastewater influent may contain metallic constituents which are not typically separated from the influent stream in the bioreactor and may leave the bioreactor through the effluent stream.

In general, treatment by bioreactor alone in certain circumstances may not be enough to meet the allowable discharge concentrations of one or more of the metallic, organic or inorganic non-metallic constituents in the effluent.

Figure 1:
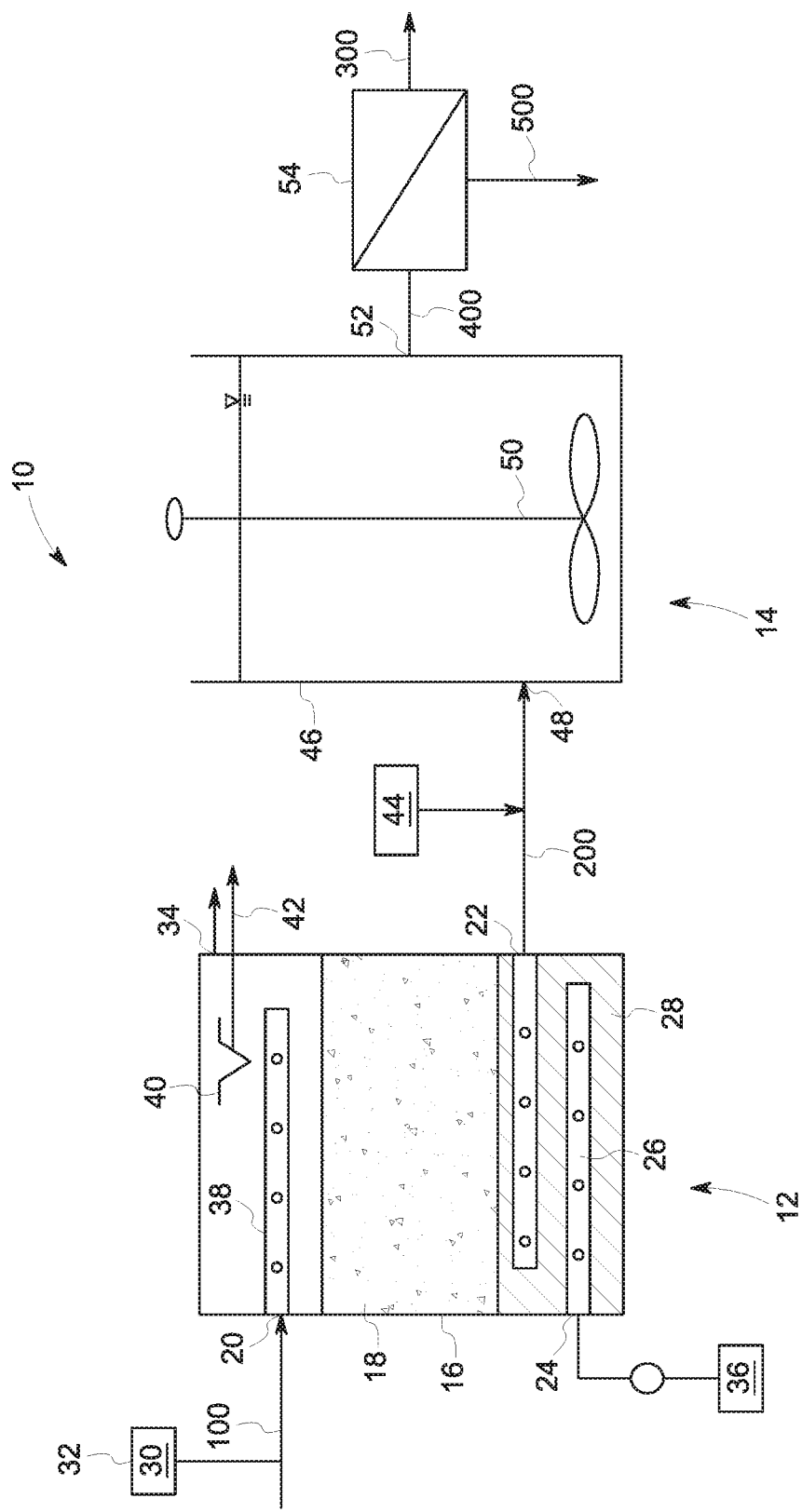
FIG. 1 is a multi-step system for treating selenium-containing wastewater according to one embodiment of the invention.

FIG. 1 shows a multi-step treatment system 10 having a selenium removal area 12 and a downstream filtration area 14. The treatment system 10 may be used to reduce the total selenium content of wastewater influent 100. In the selenium removal area, a biological reduction process is used to produce a secondary stream 200 with reduced selenium concentration. In the filtration area, filtration is used optionally with upstream coagulation or flocculation to produce a treated effluent 300 with reduced concentration of one or more of the metallic, organic or inorganic non-metallic constituents. Treated effluent 300 has a reduced total selenium concentration, preferably below discharge regulation limits. In addition, treated effluent 300 preferably has reduced concentration of one or more of the metallic, organic or inorganic non-metallic constituents when compared to the secondary stream 200.

Influent 100 flows into a reaction vessel 16 of the selenium removal area 12. The reaction vessel 16 supports a population of selenium reducing organisms, primarily facultative anaerobic bacteria. The organisms may be located in a fixed biofilm on a media bed 18. The reaction vessel 16 as shown is organized as a simple fixed media, single stage, downwards plug flow reactor. Optionally, the reaction vessel 16 may be configured for upwards flow and multiple stage reactors may also be used. Other types of reactors, including other types of fixed film reactors, may be used. For example, reaction vessel 16 may be a moving bed reactor or a fluidized bed reactor. A suitable commercially available system for the selenium removal area 12 is an ABMet™ reactor manufactured by GE Water and Process Technologies.

In the reaction vessel 16 shown, media bed 18 provides a location on which a population of microorganisms will grow and be retained within the reaction vessel. Activated carbon may be employed as the medium and provides a large surface area available for microbial growth. The activated carbon may be in the form of GAO or pelletized activated carbon. Other media might be used, for example polymeric fibers, crushed stone, pumice, sand, plastic media or gravel.

The reaction vessel 16 has an upper port 20, a lower port 22 and a backwash port 24, each of which may be connected to a distribution system 26, for example one or more perforated horizontal pipes. Aggregate 28 may be installed around the distribution systems 26 below the bed 18 to aid in flow distribution while also preventing breakthrough of media to the distribution systems 26.

During normal operation, influent 100 enters reaction vessel 16 through upper port 20 and flows downwards through media bed 18. The secondary stream 200 exits the reaction vessel 16 through lower port 22. While passing through the media bed 18, selenium is removed from the wastewater by biological reduction of the oxidized selenium species to elemental selenium.

Selenium reducing organisms occur in nature and may populate the reaction vessel 16 through their own actions over time as the treatment system 10 is operated. However, the reaction vessel 16 can be populated faster by seeding the reaction vessel 16 with a culture of appropriate organisms that have been isolated and grown separately. Microbes that have demonstrated the ability to reduce oxidized selenium to elemental form include microbes of the genus *Pseudomonas, Shewanella, Alcaligenes*. At plant start-up, a seed culture of microbes may be supplied to seed the media bed 18. Following seeding with the desired microbial culture, the reaction vessel 16 may be operated in a recycle mode for several days to allow the microbes to attach while adding nutrients to the reaction vessel 16. After seeding, normal feed flow can be introduced.

Unless the wastewater influent 100 contains other suitable matter, nutrients 30 should be added to the reaction vessel 16 during operation of the treatment system 10. In the present embodiment, nutrients 30 are added to the influent 100 from a nutrient tank 32 upstream of the reaction vessel 16. The nutrients 30 provide a carbon and energy source to support the growth and metabolism of the microorganisms in the reaction vessel 16.

Microorganisms in the reaction vessel 16 reduce selenium in the influent 100 from an oxidized state to elemental form. The elemental selenium precipitates from the wastewater in the form of stable granular nanospheres in and around the microorganisms. Since the microorganisms are attached to the media, the selenium is likewise retained within the media bed 18 until removed by a flushing procedure that will be described further below.

Some gasses may be produced in the reaction vessel 16 during operation. These gasses collect in a headspace of the reaction vessel. A gas outlet 34 may be used to release these gases to the atmosphere or collect them for further treatment.

As elemental selenium, and possibly other solids, accumulate in the media bed 18, the pressure drop across the media bed 18 will increase. At a selected time interval or pressure drop set point, backwash water 36 is pumped into backwash port 24 to flush or backwash the media bed 18. The upflow velocity during backwashing may be about 80 ft/hour, or in a range that would be used in activated carbon fluidized bed systems, but below the settling rate of the media particles.

The upflow velocity applied during flushing may result in an upward expansion of the media bed 18 by up to 30%. An upper distribution system 38, if located in the bed expansion area, may have small holes or be covered with a screen to keep media from entering it, and ports 20, 22 may be closed during flushing. During the backwash, excessive biomass growth attached to the media and solids that have been removed from the water, including selenium nanospheres, are entrained in the backwash water 36. The backwash water 36 and entrained solids are removed through troughs 40 located above the expected media expansion area and connected to a backwash effluent line 42.

Flushing may be required from between once every two weeks to only a few times each year, for example once a month. Flushing may take, for example, 30 minutes. Spent backwash water 36 may be sent to a liquid/solid separation device such as a clarifier. Cleaned backwash water 36 may be sent to the head of the system 10 or to another water treatment plant. Sludge from the clarifier may be de-watered and sent to a toxic sludge disposal system or processed further to extract the elemental selenium for safe disposal or use in industry. Although some sludge is produced, the amount is greatly reduced relative to, for example, an iron precipitation method of selenium treatment.

Following the discharge from the reaction vessel 16, the secondary stream 200 flows to the filtration area 14. An agent 44 may be added to the secondary stream 200 during operation of the system 10.

If the secondary stream 200 contains heavy metals, the agent 44 may be a metal precipitant. Such metal precipitant may be MetClear™ metals remover product manufactured by GE Water and Process Technologies.

If the secondary stream 200 contains unconsumed nutrient or selenium, the agent 44 may be a coagulating chemical adapted to precipitate and/or coagulate organic or inorganic non-metallic constituents or both.

The secondary stream 200 enters a tank 46 via port 48. The tank 46 is equipped with mixing means 50. The mixing means 50 can be, for example, a paddle or any other mechanical mixer. An appropriate amount of mixing and residence time is required to precipitate and/or coagulate the unconsumed constituents in the secondary stream 200, resulting in a supernatant that can be discharged as a tertiary stream 400 via port 52. A clarifier may be added downstream of tank 46 to produce a clarified supernatant.

Following its discharge from the tank 46, the tertiary stream 400 flows to a filtration unit 54. The filtration unit 54 may comprise any filtration device suitable for the separation of the unconsumed constituents from the tertiary stream 400. In some examples, the filtration unit 54 may comprise an ultrafiltration device.

Thus, a fluid 500 comprising at least a portion of the constituents may be removed from the tertiary stream 400, and the treated effluent 300 may be produced. Preferably, the treated effluent 300 has a reduced concentration of one or more of the organic, metallic or inorganic non-metallic constituents when compared to the tertiary stream 400.

Figure 2:
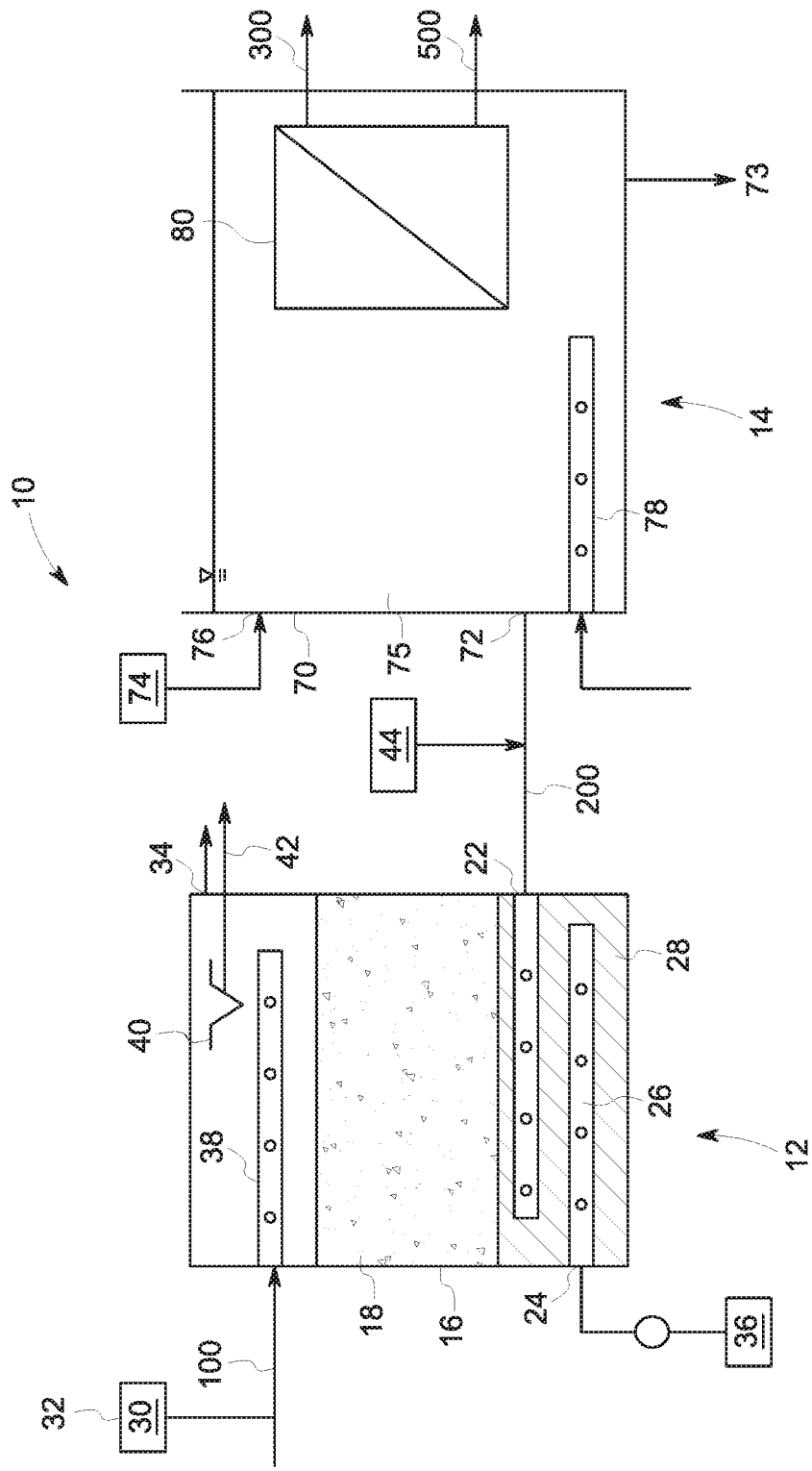
FIG. 2 is a multi-step system for treating selenium-containing wastewater according to another embodiment of the invention.

FIG. 2 shows the multi-step treatment system 10 according to another embodiment of the invention having the selenium removal area 12 and the downstream filtration area 14.

In this embodiment, the selenium removal area 12 and the associated processing steps 16-42 are identical to the previously described processing steps 16-42 in FIG. 1.

Following the discharge from the reaction vessel 16, the secondary stream 200 flows to the filtration area 14. An agent 44 may be added to the secondary stream 200 during operation of the system 10.

If the secondary stream 200 contains heavy metals, the agent 44 may be a metal precipitant. Such metal precipitant may be MetClear™ metals remover product manufactured by GE Water and Process Technologies.

The secondary stream 200 enters a reactor 70 via port 72. The reactor 70 supports a population of microorganisms responsible for treatment of the organic constituents in the secondary stream 200. Such microorganisms may populate the reactor 70 through their own actions over time as the treatment system 10 is operated. Alternatively, activated sludge 74 comprising such microorganisms responsible for treatment of the organic constituents in the secondary stream 200 may be introduced into the reactor 70 via port 76. The activated sludge 74 and the secondary stream 200 may be mixed to produce a mixture 75. While in the reactor 70, the mixture 75 may be aerated through aeration means 78, for example, a fine bubble diffuser. Introducing air into the reactor 70 may promote the growth of the microorganisms in the reactor 70. A sludge wasting port 73 may be added at the bottom of the reactor 70.

The reactor 70 also comprises a filtration unit 80 situated inside the reactor 70 and immersed in the mixture 75. The filtration unit 80 may comprise any filtration device suitable for separating one or more of the organic, metallic or inorganic non-metallic constituents from the mixture 75.

In some examples, the filtration unit 80 may comprise an ultrafiltration membrane mounted in modules and lowered into the reactor 70. The membrane may be subject to a vacuum that draws the treated effluent 300 through the membrane walls while retaining the organic, metallic and inorganic non-metallic constituents in the reactor 70. To clean the exterior of the membranes, compressed air may be introduced through a distribution manifold at the base of the membrane module.

Thus, a fluid 500 comprising at least a portion of the unconsumed constituents may be removed from the mixture 75, and the treated effluent 300 may be produced. Preferably, the treated effluent 300 has a reduced concentration of one or more of the organic, metallic or inorganic non-metallic constituents then the mixture 75.

The system 10 and process described above are intended to provide an example or a selenium treatment process and apparatus and not to limit or define any claimed invention. Other treatment systems or process may be used within the scope of an invention defined in the following claims.

While the above description provides examples of one or more processes or apparatuses, it will be appreciated that other processes or apparatuses may be within the scope of the accompanying claims.

We claim:

1. A process for treating wastewater containing selenium comprising the steps of:
   a) receiving an influent comprising metallic constituents and wastewater to be treated in a biological reactor;
   b) adding nutrients comprising organic constituents to the influent and biologically treating said influent to produce a first intermediary wastewater containing reduced concentration of selenium species;
   c) adding a chemical agent comprising a metal precipitant into said first intermediary wastewater to produce a second intermediary wastewater; and
   d) mixing, flocculating, treating, and separating one or more of the organic, metallic or inorganic non-metallic constituents from the second intermediary stream in a downstream secondary treatment zone, wherein the downstream secondary treatment zone comprises a reactor, and introducing into the reactor activated sludge comprising a population of microorganisms responsible for a treatment of the organic constituents, the reactor comprising an immersed ultrafiltration membrane, and filtering said second intermediary wastewater to remove a precipitate or floc formed in step c) to produce effluent containing reduced concentrations of one or more of an unconsumed organic, metallic or inorganic non-metallic constituents.

2. An apparatus for treating water containing selenium and metallic constituents comprising:

a) an upstream fixed film reactor vessel or vessels configured to receive nutrients comprising organic constituents, and to precipitate and remove selenium from water; and b) a downstream secondary treatment zone coupled with said upstream fixed film reactor vessel or vessels, the secondary treatment zone configured to precipitate and remove one or more of an organic, metallic or inorganic non-metallic constituents, wherein the downstream secondary treatment zone further comprises a mixer, a means to add a chemical agent comprising a metal precipitant, a flocculator, and a reactor configured to receive into the reactor an activated sludge comprising a population of microorganisms responsible for treatment of the organic constituents, the reactor comprising an immersed ultrafiltration unit.

3. The apparatus of claim 2, wherein the reactor comprises a port for receiving into the reactor the activated sludge.

\* \* \* \* \*